US011233775B1

(12) United States Patent
Yap et al.

(10) Patent No.: US 11,233,775 B1
(45) Date of Patent: Jan. 25, 2022

(54) METHOD AND SYSTEM FOR PROTECTING USER PRIVACY DURING AUDIO CONTENT PROCESSING

(71) Applicant: ZOI MEET B.V., Gouda (NL)

(72) Inventors: Neng Ming Yap, Gouda (NL); Kaarmuhilan Kalaiyarasan, Chennai (IN); Kevin Oranje, Brielle (NL)

(73) Assignee: ZOI MEET B.V., Gouda (NL)

( * ) Notice: Subject to any disclaimer, the term of this patent is extended or adjusted under 35 U.S.C. 154(b) by 0 days.

(21) Appl. No.: 17/344,954

(22) Filed: Jun. 11, 2021

(51) Int. Cl.
*H04L 29/06* (2006.01)
*G10L 15/26* (2006.01)
*G06N 20/00* (2019.01)
*G10L 15/06* (2013.01)
*G10L 15/30* (2013.01)
*G10L 25/78* (2013.01)

(52) U.S. Cl.
CPC ......... *H04L 63/0428* (2013.01); *G06N 20/00* (2019.01); *G10L 15/063* (2013.01); *G10L 15/26* (2013.01); *G10L 15/30* (2013.01); *G10L 25/78* (2013.01)

(58) Field of Classification Search
CPC ... H04L 63/0428; G06N 20/00; G10L 15/063; G10L 15/26; G10L 15/30; G10L 25/78
See application file for complete search history.

(56) References Cited

U.S. PATENT DOCUMENTS

| | | | | | |
|---|---|---|---|---|---|
| 5,153,905 | A | * | 10/1992 | Bergeron | H04M 3/533 379/209.01 |
| 6,246,771 | B1 | * | 6/2001 | Stanton | H04L 9/0894 380/286 |
| 7,100,821 | B2 | * | 9/2006 | Rasti | G06Q 20/10 235/379 |
| 7,110,747 | B2 | * | 9/2006 | Jain | H04W 12/033 455/411 |
| 7,475,251 | B2 | * | 1/2009 | Hull | G06F 21/602 713/171 |
| 10,289,967 | B2 | * | 5/2019 | Stephan | G06Q 10/063 |
| 2003/0024975 | A1 | * | 2/2003 | Rajasekharan | G06F 16/9554 235/375 |
| 2014/0047558 | A1 | * | 2/2014 | Veerubhotla | G06F 21/10 726/28 |
| 2019/0088260 | A1 | * | 3/2019 | Vachhani | G10L 15/22 |
| 2021/0135876 | A1 | * | 5/2021 | Adi | H04L 9/3247 |

* cited by examiner

*Primary Examiner* — Michael Colucci
(74) *Attorney, Agent, or Firm* — Kanika Radhakrishnan; Evergreen Valley Law Group

(57) ABSTRACT

A method and system for protecting user privacy in audio content is disclosed. An audio content including private information related to at least one user is received. The audio content is segmented to generate a plurality of audio blocks. Each audio block is associated with a sequence number based on a respective chronological position in the audio content. A random key of predefined length is generated for each audio block. The plurality of audio blocks are randomly distributed to a plurality of agents for audio-to-text transcription. The random distribution is configured to scramble a data context for protecting the user privacy of the at least one user during the audio-to-text transcription. A textual transcript corresponding to the audio content is generated based on the audio-to-text transcription, the sequence number and the random key generated for each audio block.

20 Claims, 8 Drawing Sheets

METHOD AND SYSTEM FOR PROTECTING USER PRIVACY DURING AUDIO CONTENT PROCESSING

TECHNICAL FIELD

The present technology generally relates to the field of audio content processing, more particularly, to a method and system for protecting user privacy by scrambling data context during audio content processing.

BACKGROUND

Speech is the most natural and fundamental means of communication that humans use to exchange information. Human speech is intelligible and constitutes the most efficient way to share information. Speech signals of humans may be processed to cater to a wide variety of applications. In one illustrative example, speech signal may be processed to extract biometric identifiers (i.e., physiological characteristics) of a speaker. In another illustrative example, speech signal may be processed for automatic recognition or interpretation of information. The processing of speech signals, in some applications, may involve converting audio signals corresponding to human speech into a textual form. Such Speech-To-Text (STT) processing of audio signals involves generating textual transcripts from speech input. The textual transcripts of speech signals provide a better means for deriving insights and analysis, in addition to providing flexibility of sharing textual transcripts easily across devices.

The speech signals in the audio content to be translated into text include a rich source of personal and sensitive data. More specifically, speech signal not only includes biometric profile of the speaker but also includes uttered content disclosing personally identifiable information (PII). For example, PII in a recorded conversation may include a contact number or an address of a speaker. In some scenarios, recorded conversations may be manually transcribed for comparing with ASR output to determine ASR performance During transcription, either manual or automatic, of the speech signal, personal and sensitive information related to the individual (i.e., the speaker) may be compromised. In one illustrative example, a recorded conversation of a customer in conversation with a customer service center may disclose credit card information to resolve an issue relating to a payment. The customer name along with credit card information constitutes private, sensitive information that may be misused.

In some solutions, private information, such as an individual's personal details (for example, name, address, email, phone number, etc.) and information that may be linked to the individual such as, medical, educational, employment and financial information (e.g., credit card details or bank information) may be removed or blocked for protecting the identity of the person. In one illustrative example, the agent can temporarily block or pause recording when the speaker shares PII. Although such techniques ensure confidentiality of private information, the transcription of the recorded conversation may not accurately represent the original conversation. In some cases, private information in a recorded conversation is concealed using software for protecting the PII related to the individual. However, such concealing is ineffective as, even though humans may not be able to recognize the concealed content, audio processing tools can easily interpret the content. In some cases, existing audio tools can also reverse the concealing of content to generate the original audio. As such, conventional solutions fail to protect the identity of the speaker and an individual's privacy may be compromised.

Accordingly, there is a need to protect user privacy to ensure that private information is kept confidential and the user is protected from misuse of private information. Further, it would be advantageous to avoid ineffective concealing and loss of audio data while protecting the sensitive information revealed by the user.

SUMMARY

In an embodiment of the invention, a computer-implemented method for protecting user privacy in audio content is disclosed. The method receives, by a processor, the audio content including an audio signal corresponding to at least one user. The audio signal includes private information related to the at least one user. The method segments, by the processor, the audio content to generate a plurality of audio blocks. A runtime of each audio block from among the plurality of audio blocks is configured to assume a runtime value between an upper time limit and a lower time limit. The each audio block is associated with a respective sequence number based on a chronological position of the each audio block in the audio content. The method generates, by the processor, a random key of predefined length corresponding to the each audio block. The method randomly distributes, by the processor, the plurality of audio blocks to a plurality of agents for audio-to-text transcription. Each agent from among the plurality of agents is configured to receive one or more audio blocks along with respective random keys for the audio-to-text transcription. The random distribution of the plurality of audio blocks to the plurality of agents is configured to scramble a data context related to the audio signal for protecting the user privacy of the at least one user during the audio-to-text transcription. The method generates, by the processor, a textual transcript corresponding to the audio content based on the audio-to-text transcription of the plurality of audio blocks, the sequence number associated with the each audio block and the random key generated for the each audio block.

In an embodiment of the invention, a system for protecting user privacy in audio content is disclosed. The system includes a processor and a memory. The memory stores machine executable instructions, that when executed by the processor, cause the system to receive the audio content including an audio signal corresponding to at least one user. The audio signal includes private information related to the at least one user. The system segments the audio content to generate a plurality of audio blocks. A runtime of each audio block from among the plurality of audio blocks is configured to assume a runtime value between an upper time limit and a lower time limit. The each audio block is associated with a respective sequence number based on a chronological position of the each audio block in the audio content. The system generates a random key of predefined length corresponding to the each audio block. The system randomly distributes the plurality of audio blocks to a plurality of agents for audio-to-text transcription. Each agent from among the plurality of agents is configured to receive one or more audio blocks along with respective random keys for the audio-to-text transcription. The random distribution of the plurality of audio blocks to the plurality of agents is configured to scramble a data context related to the audio signal for protecting the user privacy of the at least one user during the audio-to-text transcription. The system generates a textual transcript corresponding to the audio content based on the audio-to-text transcription of the plurality of audio blocks, the sequence number associated with the each audio block and the random key generated for the each audio block.

In another embodiment of the invention, a computer-implemented method for protecting user privacy in audio content is disclosed. The method receives, by a processor, the audio content including an audio signal corresponding to at least one user. The audio signal includes private information related to the at least one user. The method segments, by the processor, the audio content to generate a plurality of audio blocks. A runtime of each audio block from among the plurality of audio blocks is configured to assume a runtime value between an upper time limit and a lower time limit. The each audio block is associated with a respective sequence number based on a chronological position of the each audio block in the audio content. The method generates, by the processor, a random key of predefined length corresponding to the each audio block. The method randomly distributes, by the processor, the plurality of audio blocks to a plurality of human agents for audio-to-text transcription. Each human agent from among the plurality of human agents is configured to receive one or more audio blocks along with respective random keys for the audio-to-text transcription. The random distribution of the plurality of audio blocks to the plurality of human agents is configured to scramble a data context related to the audio signal for protecting the user privacy of the at least one user during the audio-to-text transcription. The method generates, by the processor, a textual transcript corresponding to the audio content based on the audio-to-text transcription of the plurality of audio blocks, the sequence number associated with the each audio block and the random key generated for the each audio block. The method trains, by the processor, a machine learning model for use in building an Automatic Speech Recognition (ASR) engine. The machine learning model is trained, at least in part, by using the textual transcript.

DETAILED DESCRIPTION

Figure 1:
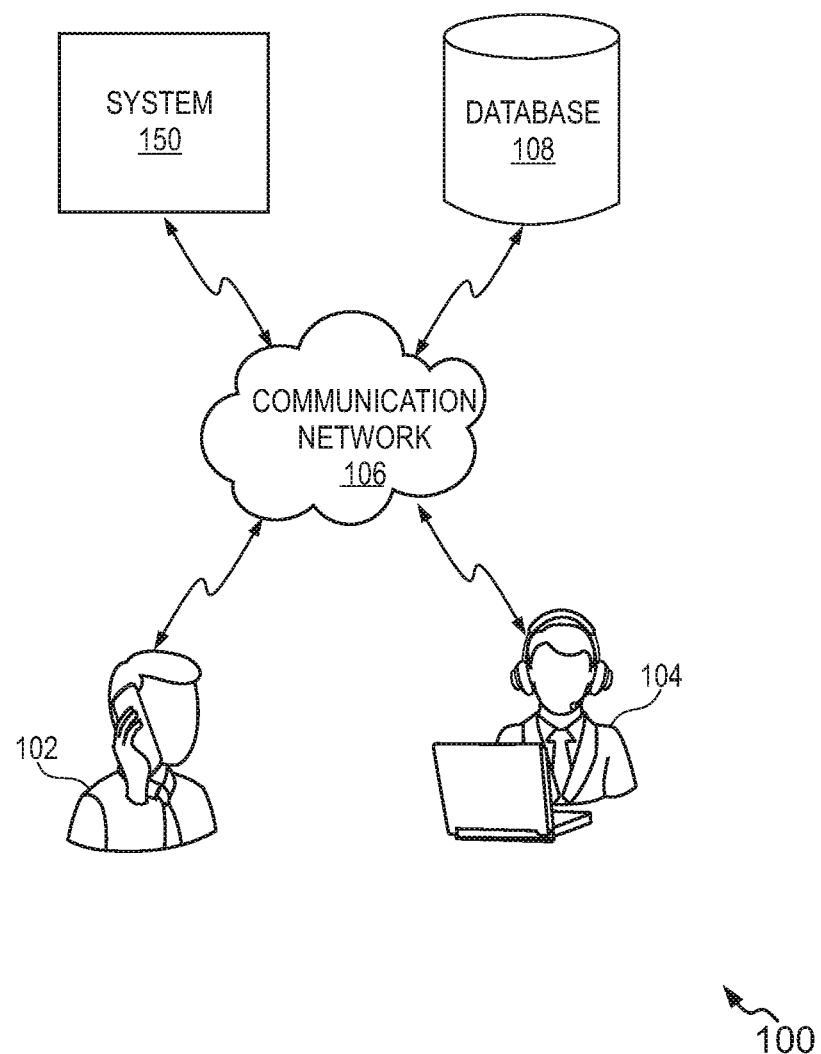
FIG. 1 is an example representation of an environment related to at least some example embodiments of the invention.

The detailed description provided below in connection with the appended drawings is intended as a description of the present examples and is not intended to represent the only forms in which the present example may be constructed or utilized. However, the same or equivalent functions and sequences may be accomplished by different examples.

Overview

Current solutions for protecting user privacy during transcription of conversations include clipping of audio parts to remove private or sensitive information from the audio, or concealing the private/sensitive information using masking techniques. However, such solutions have several drawbacks. For example, the removal of audio parts may result in a loss of audio and a generated textual transcript from a clipped audio may not accurately represent the original conversation. In some cases, private information in a recorded conversation is concealed for protecting the identity of the person. However, such concealing is ineffective as, even though humans may not be able to recognize the concealed content, audio processing tools can easily interpret the content. In some cases, existing audio tools can also reverse the concealing of content to generate the original audio. As such, conventional solutions fail to protect the audio content related to the speaker and an individual's privacy may be compromised.

Various embodiments of the present invention provide a method and a system for protecting user privacy in audio content during audio content processing. In one embodiment, audio content including an audio signal corresponding to a user (i.e. a speaker) is received. The audio signal may include private information such as personal information, health related information, banking and finance related information or education related information of the user. The audio content is segmented to generate a plurality of audio blocks. In one embodiment, the audio content is segmented into the audio blocks based on a distribution of voice activity in the audio content. One or more speech recognition techniques may be used for determining the distribution of voice activity in the audio content for facilitating segmentation of the audio content. Further, the segmentation of the audio blocks is performed in such a manner that each audio block is associated with a runtime value between an upper time limit and a lower time limit. In at least one example embodiment, the upper time limit and the lower time limit are selected based on a predetermined level of user privacy. For example, if high levels of user privacy are desired, then the audio content is segmented in such a manner that most of the audio blocks have a runtime closer to the lower time limit, thereby ensuring that an individual audio block does not have a long enough runtime to give away the context of the conversation to an agent transcribing the audio block. Similarly, if lower levels of user privacy are desired, then the audio content is segmented in such a manner that most of the audio blocks have a runtime closer to the upper time limit, thereby ensuring that audio content processing is completed relatively quicker and the individual audio block run long enough to, at the most, give only partial context of the conversation to an agent transcribing an audio block.

Further, each audio block is associated with a respective sequence number based on a chronological position of the audio block in the audio content. A random key of predefined length is also generated for each audio block, which is then correlated with the sequence number associated with the audio block and stored.

The audio blocks are randomly distributed to agents for audio-to-text transcription. The agents may correspond to automated agents and/or human agents. As such, each agent receives one or more audio blocks along with respective random keys for the audio-to-text transcription. Such random distribution of the audio blocks to the agents scrambles a data context related to the audio signal thereby protecting the user privacy of the user during the audio-to-text transcription.

The audio-to-text transcription of the audio blocks are received from the agents along with the random key generated in relation to the corresponding audio block. More specifically, each agent provides the audio-to-text transcription corresponding to the respective one or more audio blocks to configure the audio-to-text transcription for the audio blocks. In an embodiment, a flag in relation to at least one audio block from the one or more audio blocks may be received from the agent. For example, if a starting word/phrase or an ending word/phrase in an audio block (i.e. segmented portion of an audio content) is clipped, then the agent may associate a flag with such an audio block. The one or more audio blocks associated with a flag may be tagged as a flagged audio block. In response to the flagging of an audio block by an agent, a runtime value of the flagged audio block is adapted by manipulating runtime values of audio blocks adjacent to the flagged audio block. More specifically, the adjacent audio block runtime durations are changed such that the 'clipped word/phrase' lies completely in one of the audio blocks to ensure correct audio-to-text transcription. The flagged audio block and the audio blocks adjacent to the flagged audio block are then reassigned to agents for audio-to-text transcription.

For audio-blocks whose audio-to-text transcription is received from the agents, the corresponding random key is retrieved and used to identify a sequence number based on a stored correlation between the random key and the sequence number. The audio-to-text transcription of each audio block is rearranged based on associated sequence number to configure a sequential transcription of the audio content. In at least some embodiments, the textual transcript is used, at least in part, to train a machine learning model for use in building an Automatic Speech Recognition (ASR) engine. The protection of user privacy during audio content processing is further explained with reference to FIGS. 1 to 7.

FIG. 1 is an example representation 100 of an environment related to at least some example embodiments of the invention. The representation 100 depicts a user 102 engaged in a voice interaction with a customer support representative 104. The customer support representative 104 may be employed with a customer support center (not shown in FIG. 1) associated with an enterprise selling products, services and/or information to customers, such as the user 102. The customer support representative 104 is hereinafter referred to as service representative 104. It is noted that the customer support center may include several human voice representatives such as the service representative 104. Further, in addition to human voice representatives, the customer support center may also include a plurality of human chat representatives, a plurality of automated voice representatives (for example, Interactive Voice Response or IVR systems) and a plurality of automated chat representatives (for example, chatbots). Furthermore, several customers such as the user 102 may call the customer support center to seek assistance from the customer support personnel deployed at the customer support center.

The voice interaction between the user 102 and the service representative 104 may be facilitated over a communication network 106. The communication network 106 may be embodied as a wired network, a wireless network or a combination of wired and wireless networks. Examples of a wired network may include, but is not limited to, an Ethernet, a Local Area Network (LAN), and the like. Examples of a wireless network may include a cellular network, a wireless LAN, and the like. An example of a combination of wired and wireless networks may include, but is not limited to, the Internet.

In an example scenario, the user 102 may initiate an interaction with the service representative 104 to seek assistance from the service representative 104. The service representative 104 may seek the user's permission for recording the conversation and using the recorded conversation for training and testing purposes. On receiving a go-ahead from the user 102, the voice interaction between the user 102 and the service representative 104 may be recorded and stored in a database 108. It is understood that a plurality of such recorded conversations may be stored in the database 108. In at least some embodiment, one or more recorded conversations, when considered individually or in a combined manner, may configure the audio content, which is subsequently subjected to processing, such as speech-to-text or audio-to-text transcription.

In one example, the audio signals corresponding to human speech in the recorded conversations in the database 108 are transcribed to generate textual transcripts. The textual transcripts are then used to train and test acoustic and language models. The audio-to-text transcription of recorded conversations presents a privacy issue as private information related to a speaker, such as the user 102 in this case, may be recognized from the recorded conversation and sensitive information related to the user 102 may be compromised. To address this concern, in some conventional solutions, private information, such as an individual's personal details (for example, name, address, email, phone number, etc.) and information that may be linked to the individual such as, medical, educational, employment and financial information (e.g., credit card details or bank information) may be removed or blocked for protecting the identity of the person. However, the removal of content may result in a loss of audio content and the generated textual transcript from a clipped audio may not accurately represent the original conversation. In some cases, private information in a recorded conversation is concealed for protecting the identity of the person. However, such concealing is ineffective as even though, humans may not be able to recognize the concealed content, audio processing tools can easily interpret the content. In some cases, existing audio tools can also reverse the concealing of content to generate the original audio. As such, conventional solutions fail to protect the identity of the speaker and individual's privacy may be compromised.

To overcome the drawbacks of conventional solutions and provide additional benefits, a system, such as the system 150, is provided. The system 150 is configured to protect user privacy during audio content processing. It is noted that the audio content may not be limited to the recorded conversations between users and service representatives and, indeed, any digital representation of a speech signal used for transcription either by human or automated agents may be protected from a user privacy perspective by the system 150. The system 150 is explained in further detail with reference to FIG. 2.

Figure 2:
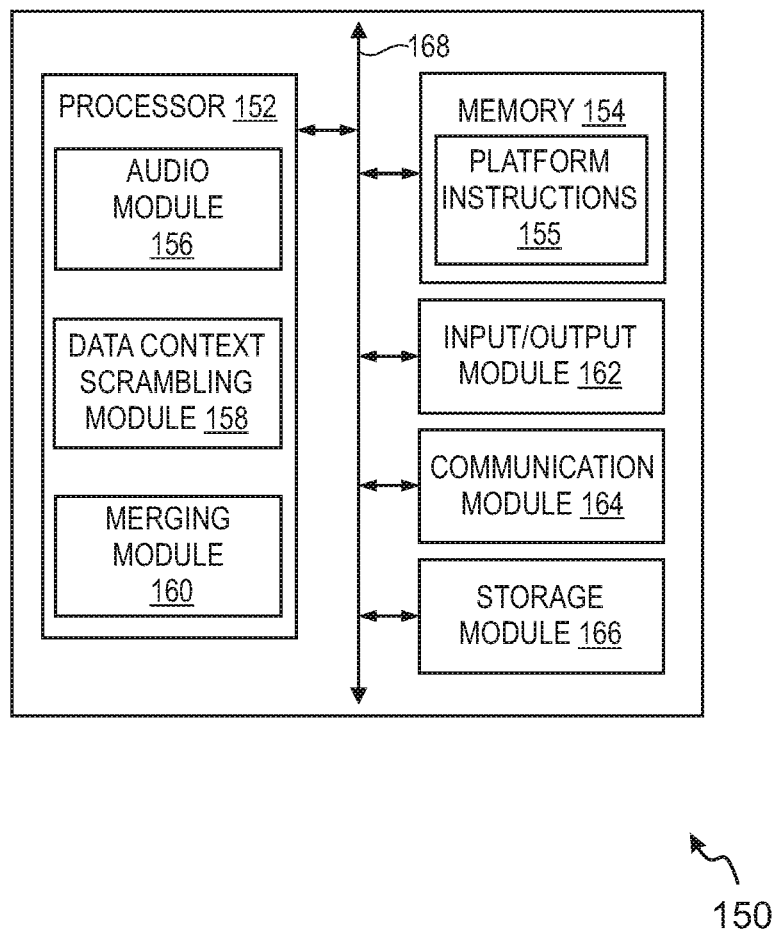
FIG. 2 is a block diagram of a system configured to protect user privacy in audio content during audio content processing, in accordance with an embodiment of the invention.

FIG. 2 is a block diagram of the system 150 configured to protect user privacy in audio content during audio content processing, in accordance with an embodiment of the invention. The term 'audio content' as used herein primarily relates to conversational content between two or more individuals (i.e., users) and accordingly, may include speech or audio signals corresponding to voice input of the individuals. However, it shall be noted that the audio content may also include other sounds from the background, such as, electrical noise from electronic appliances (e.g., refrigerators, power supply, and motor), animal sounds, traffic noise, etc. Further, though the audio content as used herein primarily refers to conversational content, in at least some embodiments, the scope of the audio content may be extended to include musical songs, audio associated with dramatic performances, movie snippets, political speeches, etc. Further, the term 'audio signal' as used herein refers to an electronic representation of sound waves corresponding to human speech. For example, electronic representation (e.g. analog representation) of user's voice in a conversation between the user 102 (i.e. the speaker) and the service representative 104 (explained with reference to FIG. 1) may configure audio signal corresponding to the speech input provided by the user 102.

In at least one embodiment, the system 150 may be implemented in a server accessible over a communication network, such as the communication network 106 shown in FIG. 1.

The system 150 includes at least one processor, such as a processor 152 and a memory 154. It is noted that although the system 150 is depicted to include only one processor, the system 150 may include more number of processors therein. In an embodiment, the memory 154 is capable of storing machine executable instructions, referred to herein as platform instructions 155. Further, the processor 152 is capable of executing the platform instructions 155. In an embodiment, the processor 152 may be embodied as a multi-core processor, a single core processor, or a combination of one or more multi-core processors and one or more single core processors. For example, the processor 152 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 152 may be configured to execute hard-coded functionality. In an embodiment, the processor 152 is embodied as an executor of software instructions, wherein the instructions may specifically configure the processor 152 to perform the algorithms and/or operations described herein when the instructions are executed.

In at least one embodiment, the processor 152 includes an audio module 156, a data context scrambling module 158 and a merging module 160. The modules of the processor 152 may be implemented as software modules, hardware modules, firmware modules or as a combination thereof.

The memory 154 may be embodied as one or more volatile memory devices, one or more non-volatile memory devices, and/or a combination of one or more volatile memory devices and non-volatile memory devices. For example, the memory 154 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc) and BD (BLU-RAY® Disc).

In at least some embodiments, the memory 154 stores instructions for: (1) segmenting the audio content into a plurality of audio blocks based on runtime restrictions, (2) generating random keys for the plurality of the audio blocks, (3) correlating the random keys with sequence number of the audio blocks, (4) randomly distributing audio blocks to agents for audio-to-text transcription, and (5) combining audio-to-text transcription received from the agents to generate textual transcript of the audio content. The instructions stored in the memory 154 are used by the modules of the processor 152 to protect user privacy during audio content processing of the audio content as will be explained in further detail later.

The system 150 also includes an input/output module 162 (hereinafter referred to as an 'I/O module 162') and at least one communication module such as a communication module 164. In an embodiment, the I/O module 162 may include mechanisms configured to receive inputs from and provide outputs to the user of the system 150. To that effect, the I/O module 162 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 152 may include I/O circuitry configured to control at least some functions of one or more elements of the I/O module 162, such as, for example, a speaker, a microphone, a display, and/or the like. The processor 152 and/or the I/O circuitry may be configured to control one or more functions of the one or more elements of the I/O module 162 through computer program instructions, for example, software and/or firmware, stored on a memory, for example, the memory 154, and/or the like, accessible to the processor 152.

The communication module 164 may include communication circuitry such as for example, a transceiver circuitry including antenna and other communication media interfaces to connect to a wired and/or wireless communication network. The communication circuitry may, in at least some example embodiments, enable reception/transmission of audio content (such as recorded conversations) from remote network entities, such as the database 108 (shown in FIG. 1) or a server at a customer support center configured to maintain real-time information related to interactions between customers and service representatives.

In at least one example embodiment, the communication module 164 is configured to receive audio content, such as a recorded conversation or any digital capture of a human speech signal. For example, the communication module 164 may receive the audio content including audio signals corresponding to a stored conversation, such as a conversation between a user and a customer support representative. The communication module 164 may be configured to forward the audio content to the processor 152. The modules of the processor 152 in conjunction with the instructions stored in the memory 154 may be configured to process the audio content for protecting user privacy i.e. scramble data context of the audio content and generate textual transcript corresponding to the audio content.

The term 'data context' as used herein refers to a logical meaning conveyed by a sequence of words and phrases associated with the audio signal in the audio content. Further, the term 'scrambling of data context' as used herein refers to an intentional attempt to obfuscate or hide the meaning, which was originally conveyed by the sequence of words and phrases in the audio signal. As will be explained in further detail, the scrambling of data context is achieved by segmenting the audio content into audio blocks, which individually are not capable of conveying the meaning, and randomly distributing the audio blocks to agents for audio-to-text transcription in a manner that makes it almost impossible to identify data context in the audio content or discern the private information that may be shared by the speaker (i.e., the user 102) during the conversation with the service representative.

The system 150 is further depicted to include a storage module 166. The storage module 166 is any computer-operated hardware suitable for storing and/or retrieving data. In one embodiment, the storage module 166 is configured to store random keys generated for audio blocks associated with the audio content, and a correlation of the random keys with sequence numbers of the audio blocks based on a chronological position of the respective audio block in the audio content. The storage module 166 may include multiple storage units such as hard drives and/or solid-state drives in a redundant array of inexpensive disks (RAID) configuration. In some embodiments, the storage module 166 may include a storage area network (SAN) and/or a network attached storage (NAS) system. In one embodiment, the storage module 166 may correspond to a distributed storage system, wherein individual databases are configured to store custom information, such as random keys, correlation between each random key and a sequence number, audio blocks.

In some embodiments, the processor 152 and/or other components of the processor 152 may access the storage module 166 using a storage interface (not shown in FIG. 2). The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 152 and/or the modules of the processor 152 with access to the storage module 166.

In an embodiment, various components of the system 150, such as the processor 152, the memory 154, the I/O module 162, the communication module 164, and the storage module 166 are configured to communicate with each other via or through a centralized circuit system 168. The centralized circuit system 168 may be various devices configured to, among other things, provide or enable communication between the components of the system 150. In certain embodiments, the centralized circuit system 168 may be a central printed circuit board (PCB) such as a motherboard, a main board, a system board, or a logic board. The centralized circuit system 168 may also, or alternatively, include other printed circuit assemblies (PCAs) or communication channel media.

The processing of the audio content is explained hereinafter with reference to a single audio content item including an audio signal, i.e. electronic representation of a speech input of at least one user. It is understood that a plurality of audio content items including a variety of audio signals may similarly be processed to generate respective textual transcription. In one illustrative example, audio content items corresponding to several conversations may similarly be processed to generate a plurality of textual transcriptions to facilitate training of acoustic and language models for building an Automatic Speech Recognition Engine, as will be explained in further detail later. The processing of the audio content by the audio module 156 is explained next with reference to FIG. 3.

Figure 3:
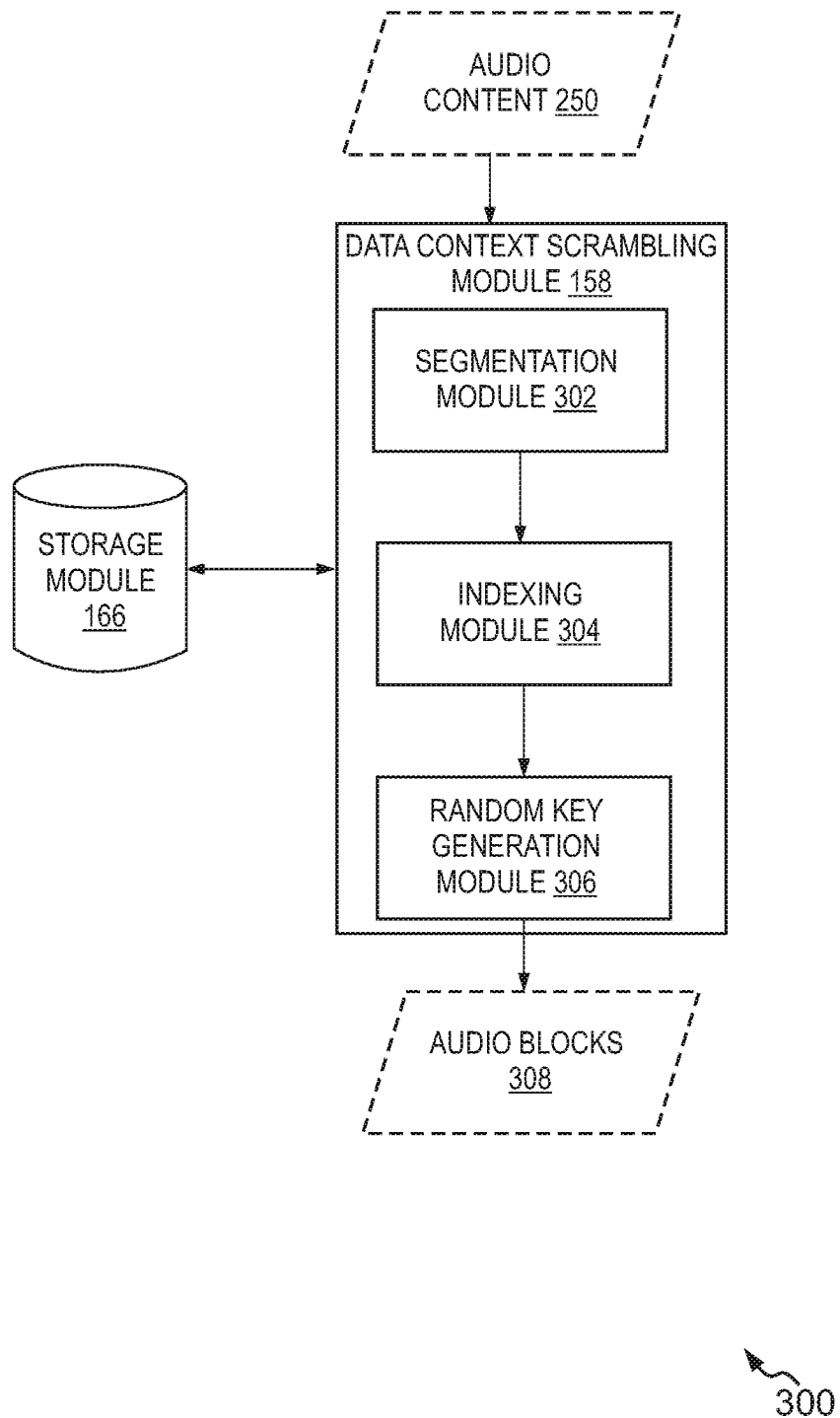
FIG. 3 is a block diagram of an audio module of the system of FIG. 2, in accordance with an embodiment of the invention.

Referring now to FIG. 3, a block diagram 300 of the audio module 156 for illustrating generation of audio blocks from an audio content 250 is shown in accordance with an embodiment of the invention. The audio module 156 may be configured to execute instructions stored in the memory 154 (shown in FIG. 2) for performing various respective functionalities, which are described in detail hereinafter.

The audio module 156 is depicted to include a segmentation module 302, an indexing module 304 and a random key generation module 306.

As explained with reference to FIG. 2, the audio content 250 may be received by the system 150 from a database, such as the database 108 (shown in FIG. 1) for processing purposes. In at least one example embodiment, the processing of the audio content may be performed to generate a textual transcript corresponding to each audio content item. Further, a plurality of textual transcripts generated in relation to a plurality of audio content items may then be processed for use in training language and acoustic models and building ASR engines.

In one embodiment, the communication module 164 of the system 150 (shown in FIG. 2) is configured to receive the audio content 250 and forward the audio content 250 to the processor 152 (shown in FIG. 2). The audio content 250 includes an audio signal corresponding to at least one user, for example the user 102 (shown in FIG. 1). The audio signal may include private information related to the user, for example, personal information, health related information, banking and finance related information and education related information of the user. In at least one embodiment, the audio module 156 of the processor 152 may receive the audio content 250 and initiate processing of the audio content 250.

The segmentation module 302 of the audio module 156 is configured to receive the audio content 250 and segment (i.e. slice) the audio content 250 into discrete segments of variable runtimes to generate a plurality of audio blocks, which are referred to hereinafter as audio blocks 308. A runtime of each audio block from among the audio blocks 308 is configured to assume a runtime value between an upper time limit and a lower time limit. Specifically, a distribution of voice activity associated with the audio signal in the audio content 250 is analysed for generating the audio blocks 308 such that each audio block captures at least one word or a phrase while adhering to the upper time limit and the lower time limit restrictions. The limitations on the runtime value of each audio block imposed by restricting the upper time limit and the lower time limit ensure that each audio block is intelligible for audio-to-text transcription and not too long to reveal private information of the user.

In at least one example embodiment, the upper time limit Tu and the lower time limit $T_L$ are selected based on a predetermined level of user privacy. In one illustrative example, audio content processing of utterances related to banking information of a user may require higher level of privacy and may require segmenting user utterances (i.e., the audio content) to smaller audio blocks. More specifically, the lower time limit $T_L$ and the upper time limit Tu are carefully selected so as to not reveal too much information, for example, the lower time limit $T_L$ may be selected as 2 seconds and the upper time limit Tu may be selected as 3 seconds. This ensures that a runtime of each audio block in the segmented audio content 250 is associated with a runtime values of 2 to 3 seconds, thereby capturing at the most one or two words or a short phrase, thereby avoiding revealing a context of the user's speech input such as the nature/details of the financial transaction. In another illustrative example, audio content processing of service requests such as an Air Conditioner (AC) repair request may not require very high levels of user privacy. In such cases, the lower time limit $T_L$ and the upper time limit Tu may be suitably selected to segment the audio content 250 into audio blocks with higher runtime value, for example audio blocks having runtime values of 3 to 4 seconds duration.

In one embodiment, one or more speech recognition techniques are used for detecting presence/absence of voice activity for determining a distribution of voice activity in the audio content 250. For example, a speech spectrogram may be used to determine a distribution of the voice activity in the audio content 250. The speech spectrogram may help identify cues related to intonations and pauses (i.e., silence portions) for identifying word/phrase boundaries in a sentence uttered by the speaker (e.g., the user 102). When voiced portions are detected in the audio content 250, then the segmentation module 302 selects a runtime value such that words/phrases lie completely in one audio block while not exceeding the runtime value restrictions specified by the upper time limit and the lower time limit. Alternatively, if silence segments (i.e., pauses between words, phrases or sentences) extend for longer duration, then voice activity is lower and therefore chunk of the audio signal is clubbed together to configure a larger block (e.g., audio block of typically 3 seconds duration). In one illustrative example, if the speaker (i.e., the user 102) is providing a payment card number for resolving a payment issue, the speaker may pause after reciting 1-2 numbers (e.g., '56') of a 16-digit payment card number "5678 1234 9876 2211". As such, an audio block may capture speech relating to the 1-2 numbers i.e., "five six". It shall be noted that runtime value of individual audio blocks in the audio blocks 308 are not identical and may vary depending on a length of voiced portions for capturing a complete word or a phrase.

In one illustrative example, the audio content 250 may last for 8 seconds. If the lower time limit $T_L$ (i.e., minimum runtime value) is preset to 1 second and the upper time limit $T_H$ (i.e., maximum runtime value) is preset to 3 seconds, the audio content 250 may be segmented into 5 audio blocks ($A_1$, $A_2$, $A_3$, $A_4$, and $A_5$) as shown below:

Audio block $A_1$ from 0 second to 2.2 seconds
Audio block $A_2$ from 2.2 seconds to 3.3 seconds
Audio block $A_3$ from 3.3 seconds to 4.8 seconds
Audio block $A_4$ from 4.8 seconds to 6 seconds
Audio block $A_5$ from 6 seconds to 8 seconds The indexing module 304 in conjunction with the memory 154 is configured to generate a sequence number for each audio block. More specifically, the sequence number for an audio block is based on a chronological position of the audio block in the audio content 250. In an illustrative example, the audio block $A_1$ is associated with a sequence number '001' indicating that $A_1$ is a first audio block among the audio blocks ($A_1$, $A_2$, $A_3$, $A_4$, and $A_5$) related to the audio content 250. Similarly, the audio block $A_2$ is associated with a sequence number '002', the audio block $A_3$ is associated with a sequence number '003', the audio block $A_4$ is associated with a sequence number '004' and the audio block $A_5$ is associated with a sequence number '005'. It is noted that a three digit representation of the sequence numbers is shown for illustration purposes and that the sequence number for an audio block may be represented in different ways, for example, using alphabets, using numbers or any combination of the above, to depict an order or exact sequence of the audio blocks 308. Indexing based on the chronological position ensures that an order of audio blocks 308 in the audio content 250 does not get scrambled when combining the audio-to-text transcription corresponding to the audio blocks 308 received from a plurality of agents, as will be explained in further detail later.

The random key generation module 306 in conjunction with the memory 154 is configured to generate a random key for each audio block. The random key is configured to serve as an identifier capable of uniquely identifying the respective audio block among the audio blocks 308. In at least one example embodiment, the random key is an n-bit alphanumeric identifier. In one illustrative example, the audio block $A_1$ is assigned a random key 'kasjdjwk'. It shall be noted that no two audio blocks may be assigned the same random key and each audio block has a random key that is different from that of other audio blocks.

In at least one example embodiment, the random key of each audio block is correlated with the sequence number associated with the corresponding audio block. In one illustrative example, the random key 'kasjdjwk' of the audio block $A_1$ is correlated with the sequence number '001' of the audio block $A_1$. The correlation between the random key of each audio block and the corresponding sequence number is stored in the storage module 166. More specifically, the storage module 166 is populated with correlation data including information related to correlations between a random key of each audio block and a sequence number of the corresponding audio block. An example tabular representation capturing the correlation between the random keys and the sequence numbers of the audio blocks is depicted in Table 1:

TABLE 1

| Audio Block | Sequence number | Random Key |
|---|---|---|
| $A_1$ | 001 | kasjdfwk |
| $A_2$ | 002 | kemelre |
| $A_3$ | 003 | ektjlmni |
| $A_4$ | 004 | nokipole |
| $A_5$ | 005 | qiklgtre |

Given the representation in the Table 1, the audio block $A_1$ is associated with a sequence number '001' and a random key 'kasjdfwk', which uniquely identifies the audio block $A_1$ among the audio blocks $A_1$, $A_2$, $A_3$, $A_4$ and $A_5$. Such correlation between the sequence number and the random key associated with each audio block may be used for generating the textual transcript.

Referring back to FIG. 2, the data context scrambling module 158 in conjunction with the instructions in the memory 154 is configured to receive the audio blocks 308 from the audio module 156. The data context scrambling module 158 is further configured to randomly distribute the audio blocks 308 to a plurality of agents (hereinafter referred to as 'agents') for audio-to-text transcription of the audio blocks 308. In one illustrative example, each agent may randomly receive one or more audio blocks from among the audio blocks 308 for audio-to-text transcription. In one embodiment, at least one agent from among the plurality of agents corresponds to a human agent. For example, the audio blocks 308 may be randomly distributed among several human agents such that each human agent may receive one or more audio blocks for audio-to-text transcription. In one embodiment, the plurality of agents correspond to a plurality of automated agents. For example, the audio blocks 308 may be randomly distributed among several virtual or machine agents such that each virtual (i.e. automated) agent may receive one or more audio blocks for audio-to-text transcription.

During random distribution, each agent is configured to receive one or more audio blocks along with respective random keys for the audio-to-text transcription. In one illustrative example, the audio blocks $A_1$ and $A_3$ may be assigned to a human agent for audio-to-text transcription and accordingly, the human agent may be provided with the audio blocks $A_1$ and $A_3$ along with random keys 'kasjdfwk', and 'ektjlmni' corresponding to the audio blocks $A_1$ and $A_3$, respectively. In one embodiment, a randomising algorithm is used for randomly distributing the audio blocks 308 to the agents. Some examples of the randomizing algorithm may include but are not limited to Fisher-Yates shuffle, Sattolo's algorithm, Naïve method, Monte Carlo, Las Vegas, and the like. The choice of randomizing algorithm for randomly assigning the audio blocks 308 may be configured to achieve maximum randomness and ensure that no two random keys associated with consecutive sequence numbers are assigned to the same agent.

The random distribution of the audio blocks 308 to the agents (i.e., automated agents and human agents) is configured to scramble a data context related to the audio content 250 thereby protecting the user privacy of the user during the audio-to-text transcription with no associated loss of data. Moreover, the random distribution of the audio blocks 308 not only protects the identity of the speaker (i.e., the user) but also ensures that an agent has no access to personal information revealed by the speaker (i.e., the user) in the audio content 250. Further, the scrambling of data context ensures that the agents have no information related to the data context of the audio content 250, and thereby addressing the concern related to maintaining the user privacy during audio content processing.

Figure 4:
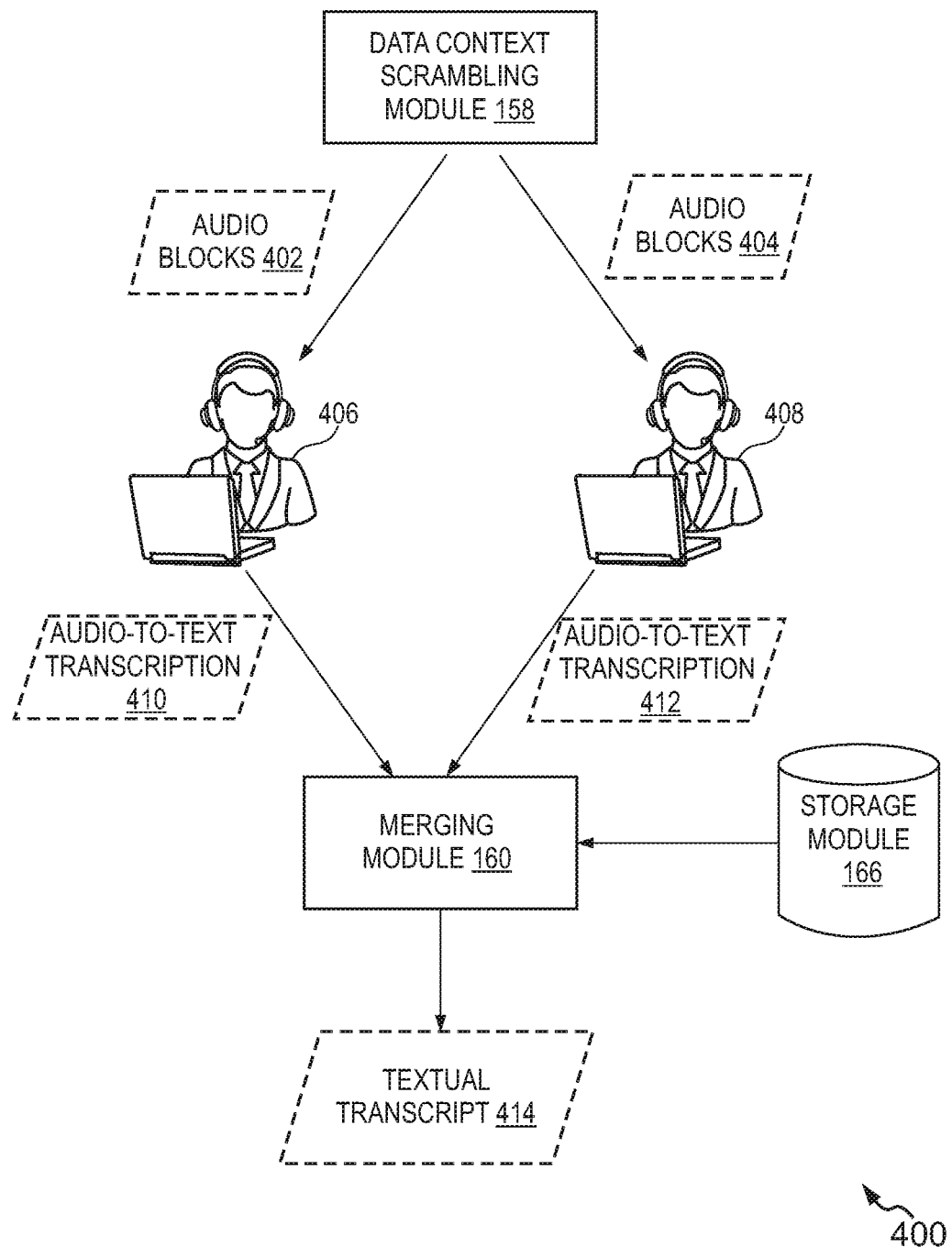
FIG. 4 is a schematic diagram for illustrating generation of textual transcript corresponding to audio content, in accordance with an embodiment of the invention.

FIG. 4 is a block diagram 400 for illustrating generation of textual transcript of the audio content 250, in accordance with an embodiment of the invention. As explained with reference to FIG. 3, the audio content 250 is segmented into the audio blocks 308 and the audio blocks 308 are indexed with sequence numbers based on chronological position of each audio block in the audio content 250 and each audio block is assigned with a random key. Further, the audio blocks 308 are randomly distributed along with respective random keys to agents for audio-to-text transcription.

In an illustrative example, if there are 'm' agents for audio-to-text transcription and 'p' audio blocks in the audio content 250, the 'p' audio blocks are divided by 'm' as equally as possible. For example, if there are 6 audio blocks and 2 agents, then each agent may randomly be assigned 3 audio blocks for audio-to-text transcription. In FIG. 4, two agents such as an agent 406 and an agent 408, hereinafter referred to as Agent A and Agent B, respectively, are shown to receive one or more audio blocks from among the audio blocks 308 (shown in FIG. 3). More specifically, the agent A (i.e. agent 406) is depicted to receive audio blocks 402 and the agent B (i.e. agent 408) is depicted to receive audio blocks 404 for generating audio-to-text transcription of corresponding audio blocks. It is understood that the audio blocks 402 and the audio blocks 404 together configure the audio blocks 308 (shown in FIG. 3)

An example representation of randomly distributing the audio blocks 308 in the audio content 250 to agents (i.e., agent A and agent B) for generating audio-to-text transcription is depicted in Table 2:

| Random key | Audio block | Agents |
|---|---|---|
| nokipole | $A_4$ | B |
| kemelre | $A_2$ | B |
| qiklgtre | $A_5$ | A |
| ektjlmni | $A_3$ | A |
| kasjdfwk | $A_1$ | A |

As an example, the agent A receives random keys (i.e., kasjdfwk, ektjlmni and qiklgtre) corresponding to audio blocks $A_1$, $A_3$, and $A_5$, respectively and the agent B receives random keys (i.e., kernelre and nokipole) corresponding to audio blocks $A_2$ and $A_4$, respectively. It shall be noted that the agents A and B receive only the random keys and corresponding audio blocks (i.e., audio snippets), thus having no information related to overall context of an audio block in the audio content 250. Such randomized assignment of audio blocks addresses the user privacy concern and avoids access to private information that the speaker (i.e., the user) may have revealed during a conversation (i.e., the audio content).

In at least some example scenarios, during audio-to-text transcription, the agent may flag an audio block as unclear in case it is not discernible due to a word being split between two adjacent audio blocks. In one illustrative example, assuming the speaker paused between syllables of a word such as, 'pay-ment', the audio block $A_4$ includes only phonemes related to the syllable 'ment' that makes no sense to an agent such as, the agent B during audio-to-text-transcription. In at least one example embodiment, the agent is provided with an option to set a flag indicating an incomplete word in the audio block. More specifically, the audio block associated with a flag is tagged as a flagged audio block by the agent during audio-to-text transcription. To that effect, the agent can change a status of the flag associated with the audio block to indicate if the word is split at 'start of audio block', 'end of audio block' or 'at start and end of the audio block'. The human agents manually listen to an audio block before tagging the audio block as a flagged audio block. Alternatively, automated agents deduce an incomplete word in an audio block based on distribution of voice activity in the audio block and/or by using automatic speech recognition techniques. The audio block related to a flag indicates that some portion of the audio block is not discernible and is hereinafter referred to as 'a flagged audio block'. Such flagged audio blocks are sent for a second pass.

During the second pass, a runtime value of the flagged audio block is adapted based on the corresponding flag. More specifically, runtime values of the flagged audio block and adjacent audio blocks are manipulated to capture the incomplete word in at least one audio block (i.e., the flagged audio block or one of the adjacent audio blocks) while strictly adhering to runtime value restrictions. As such, after manipulation the incomplete word may be a part of the flagged audio block or any of the adjacent audio blocks. Thereafter, the flagged audio block and audio blocks adjacent to the flagged audio block are reassigned to an agent for audio-to-text-transcription.

In one illustrative example, if the flag associated with the audio block $A_4$ indicates a split at 'start of audio block', audio content from a preceding block, for example, 0.2 second audio data from a preceding audio block (e.g., audio block $A_3$) is clipped and appended to the audio block $A_4$. In another illustrative example, if the flag indicates a split at 'end of audio block' in the audio block $A_4$, audio data from a succeeding block, for example, 0.1 second audio content from the succeeding audio block (e.g., audio block $A_5$) is clipped and appended to the audio block $A_4$. It shall be noted that during manipulation of audio blocks, length of the clipped audio data appended to an audio block (e.g., flagged audio block) from an adjacent audio block (i.e., the preceding or succeeding audio block) is completely removed from the preceding/succeeding block while limiting the runtime value of the audio blocks (i.e., the flagged audio blocks and adjacent audio blocks) between the lower time limit and the upper time limit. It shall be noted that such iteration may be performed till all the audio blocks in the audio content 250 do not have undiscernible words or phrases due to splitting of the audio content 250 into the audio blocks 308.

The agents A and B transcribe the audio blocks 402 and 404 assigned to generate audio-to-text transcription for each audio block. As shown in FIG. 4, the agent A generates audio-to-text transcription 410 corresponding to the audio blocks 402 and the agent B generates audio-to-text transcription 412 corresponding to the audio blocks 404. As per the aforementioned illustrative example, the agent A generates audio-to-text transcription corresponding to audio blocks $A_1$, $A_3$, and $A_5$ and the agent B generates audio-to-text transcription corresponding to audio blocks $A_2$ and $A_4$. Further, the agents A and B provide the audio-to-text transcription 410 and 412 respectively to the merging module 160 of the system 150.

The merging module 160 in conjunction with the instructions in the memory 154 is configured to generate the textual transcript 414 corresponding to the audio content 250. More specifically, the random key related to an audio block is used to map the audio-to-text transcription received from an agent to a sequence number associated with the audio block. It shall be noted that the correlation between the random key and sequence number of each audio block is stored in the storage module 166. As such, the sequence number associated with each audio block is retrieved from the storage module 166. The audio-to-text transcription received in relation to each audio block is rearranged based on associated sequence number to configure a sequential transcription of the audio content. The sequential transcription of the audio content configures, at least in part, the textual transcript 414 corresponding to the audio content 250.

In an illustrative example, the agent A generates audio-to-text transcription 'I received', 'for my credit card' and @xyz.com' for the audio blocks $A_1$, $A_3$, and $A_5$, respectively. Similarly, the agent B generates audio-to-text transcription, 'credit history' and 'on jason26' for the audio blocks $A_2$ and $A_4$, respectively. Moreover, the agents A and B append the random key related to each audio block along with the audio-to-text transcription. For example, 'on jason26' corresponds to the audio block $A_4$ associated with the random key 'nokipole'. It is understood that the random key associated with each block is used to map the audio-to-text transcription of the audio block to chronological position in the audio content based on corresponding sequence number.

In scenarios, where the audio block was modified during transcription, for example the audio data was added or removed with respect to a preceding audio block or a succeeding audio block during a second pass, the audio-to-text transcriptions are checked as per sequence number for any transcription errors (e.g., repetition of words or syllables). The merging module 160 is configured to remove any repetitive syllables or words. Thereafter, the merging module 160 is configured to combine the audio-to-text transcription 410 and 412 from the agents A and B based on the mapping of the random key associated with each audio block to respective sequence numbers for generating the textual transcript 414. As shown in Table 1, the audio-to-text transcription of the audio blocks $A_1$, $A_2$, $A_3$, $A_4$, and $A_5$ related to the random keys are mapped based on corresponding sequence numbers to generate the textual transcript 414 'I received credit history for my credit card on jason26@xyz.com'.

The textual transcript 414 is used along with a plurality of other similarly generated transcripts as an input for building a model that may be utilized for training an Automatic Speech Recognition (ASR) engine. As the textual transcript is reconstructed based on mapping of random keys related to the audio blocks, there is no loss of data while also protecting privacy of the user during audio transcription as will be explained next with reference to FIGS. 5A-5B.

Figure 5A:
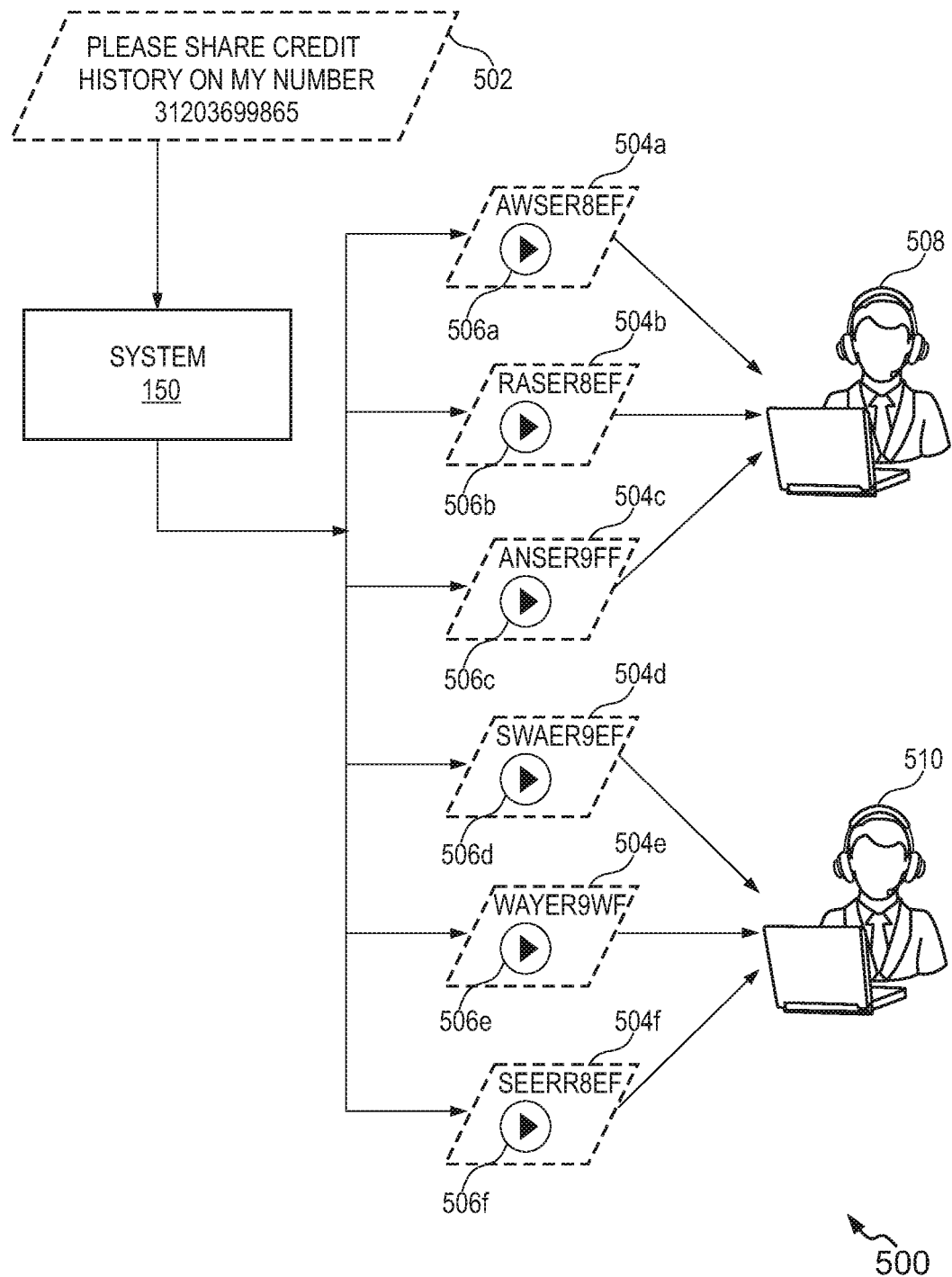
FIGS. 5A and 5B show representations for illustrating an example process flow for protecting user privacy during audio content processing, in accordance with an embodiment of the invention.
Figure 5B:
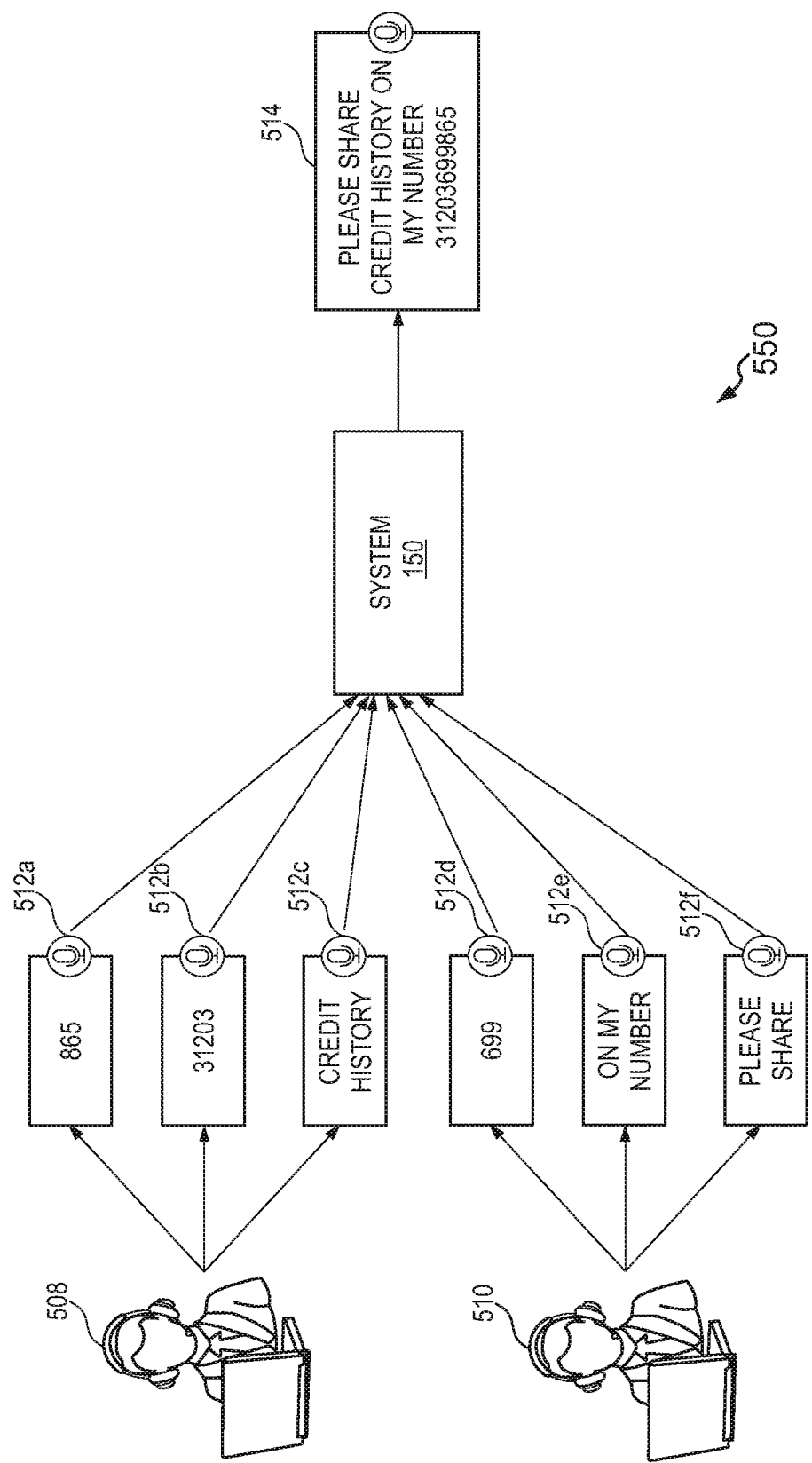

FIGS. 5A and 5B show representations 500 and 550, respectively, for illustrating steps performed by the system 150 for protecting user privacy during audio content processing, in accordance with an embodiment of the invention. As explained with reference to FIG. 1, audio content processing involving audio-to-text transcription of recorded conversations or of any digital representation of audio content presents a privacy issue as private information related to a user may be compromised during transcription. The system 150 as explained with reference to FIGS. 2 to 4 and also depicted in the representations 500 and 550 may be used for protecting user privacy.

FIG. 5A shows the representation 500 depicting an audio content 502 being provided as an input to the system 150. The audio content 502 includes an audio signal corresponding to a user's speech input: 'PLEASE SHARE CREDIT HISTORY ON MY NUMBER 31203699865'. The audio content 502 includes a private information in the form of a phone number of the user. As explained with reference to FIG. 3, the system 150 is configured to segment (i.e., slice) the audio content 502 and generate audio blocks, for example, 6 audio blocks $B_1$, $B_2$, $B_3$, $B_4$, $B_5$ and $B_6$.

In one illustrative example, the audio block $B_1$ includes audio data 'PLEASE SHARE', audio block $B_2$ includes audio data 'CREDIT HISTORY', audio block $B_3$ includes audio data 'ON MY NUMBER', audio block $B_4$ includes audio data '31203', audio block $B_5$ includes audio data '699' and audio block $B_6$ includes audio data '865'. It is noted that the audio blocks are configured to capture a word or a phrase of the audio content 502. Moreover, a size of the audio blocks $B_1$, $B_2$, $B_3$, $B_4$, $B_5$ and $B_6$ are configured in such a manner that a runtime value of each audio block is limited between a lower time limit (i.e., a minimum runtime value) and an upper time limit (i.e., a maximum runtime value) to ensure that agents generating the audio-to-text transcription of the audio blocks ($B_1$, $B_2$, $B_3$, $B_4$, $B_5$ and $B_6$) do not decipher the context of an audio block in the audio content.

Each audio block is assigned a random key that uniquely represents the audio block, for example, audio block $B_1$ is assigned a random key 'SEERR8EF', audio block $B_2$ is assigned a random key 'ANSER9FF', audio block $B_3$ is assigned a random key 'WAYER9WF', audio block $B_4$ is assigned a random key 'RASER8EF', audio block $B_5$ is assigned a random key 'SWAER9EF', and audio block $B_6$ is assigned a random key 'AWSER8EF'. Further, each of the plurality of audio blocks $B_1$, $B_2$, $B_3$, $B_4$, $B_5$ and $B_6$ is associated with a sequence number based on their chronological position in the audio content.

As explained with reference to FIG. 2, the system 150 is configured to randomly distribute the audio blocks $B_1$, $B_2$, $B_3$, $B_4$, $B_5$ and $B_6$ to a plurality of agents i.e., human agents and/or automated agents. Randomly assigning the audio blocks $B_1$, $B_2$, $B_3$, $B_4$, $B_5$ and $B_6$ to the plurality of agents is configured to scramble a data context related to the audio content 502 for protecting the user privacy of the user during the audio-to-text transcription.

In the representation 500, an audio block along with the respective random key is shown using a dotted box, such as the dotted box 504a, 504b, 504c, 504d, 504e and 504f. The dotted boxes are depicted to include an audio snippet and the random key. For example, the dotted box 504a is depicted to include an audio snippet 506a and a random key 'AWSER8EF'. Similarly, dotted boxes 504b, 504c, 504d, 504e and 504f include audio snippets 506b, 506c, 506d, 506e and 506f along with corresponding random keys, respectively. The audio snippets 506a, 506b, 506c, 506d, 506e and 506f correspond to the audio blocks $B_6$, $B_4$, $B_2$, $B_5$, $B_3$ and $B_1$. The audio blocks along with the respective random keys are randomly assigned to agents, such as the agents 508 and 510. For example, the agent 508 is assigned audio blocks $B_6$, $B_4$ and $B_2$ (i.e. audio snippets 506a, 506b and 506c along with corresponding random keys) and the agent 510 is assigned audio blocks $B_5$, $B_3$ and $B_1$ (i.e. audio snippets 506d, 506e and 506f along with corresponding random keys). As the random distribution of audio blocks in the audio content 502 scrambles the data context of audio blocks, the agents may not decipher the data context of an audio block or identify private information in the audio content thereby offering protection of private information for the user during audio-to-text transcription. It is noted that although human agents have been shown in FIGS. 5A and 5B, the audio-to-text transcription may be performed by automated agents.

FIG. 5B shows the representation 500 depicting agents providing audio-to-text transcription of the assigned audio blocks to the system 150. More specifically, the agent 508 generates audio-to-text transcriptions 512a, 512b, and 512c corresponding to the audio blocks $B_6$, $B_4$, $B_2$ and the agent 510 generates audio-to-text transcriptions 512d, 512e and 512f corresponding to the audio blocks $B_5$, $B_3$ and $B_1$. The audio-to-text transcription 512a, 512b, 512c, 512d, 512e and 512f are received by the system 150 along with respective random keys (not shown in FIG. 5B).

The system 150 is configured to use the random keys associated with the audio-to-text transcriptions 512a, 512b, 512c, 512d, 512e and 512f to identify sequence numbers for the corresponding audio blocks. For example, the sequence number for the audio-to-text transcription 512a may be identified to be 6, whereas the sequence number for the audio-to-text transcription 512f may be identified to be 1. The system 150 may be configured to rearrange the audio-to-text transcriptions 512a, 512b, 512c, 512d, 512e and 512f as per the sequence numbers to generate a textual transcript 514 'PLEASE SHARE CREDIT HISTORY ON MY NUMBER 31203699865' related to the audio content 502. The textual transcript 514 is used along with a plurality of other similarly generated transcripts as an input for building a model to train an Automatic Speech Recognition (ASR) engine.

A method for protecting user privacy during audio content processing is explained next with reference to FIG. 6.

Figure 6:
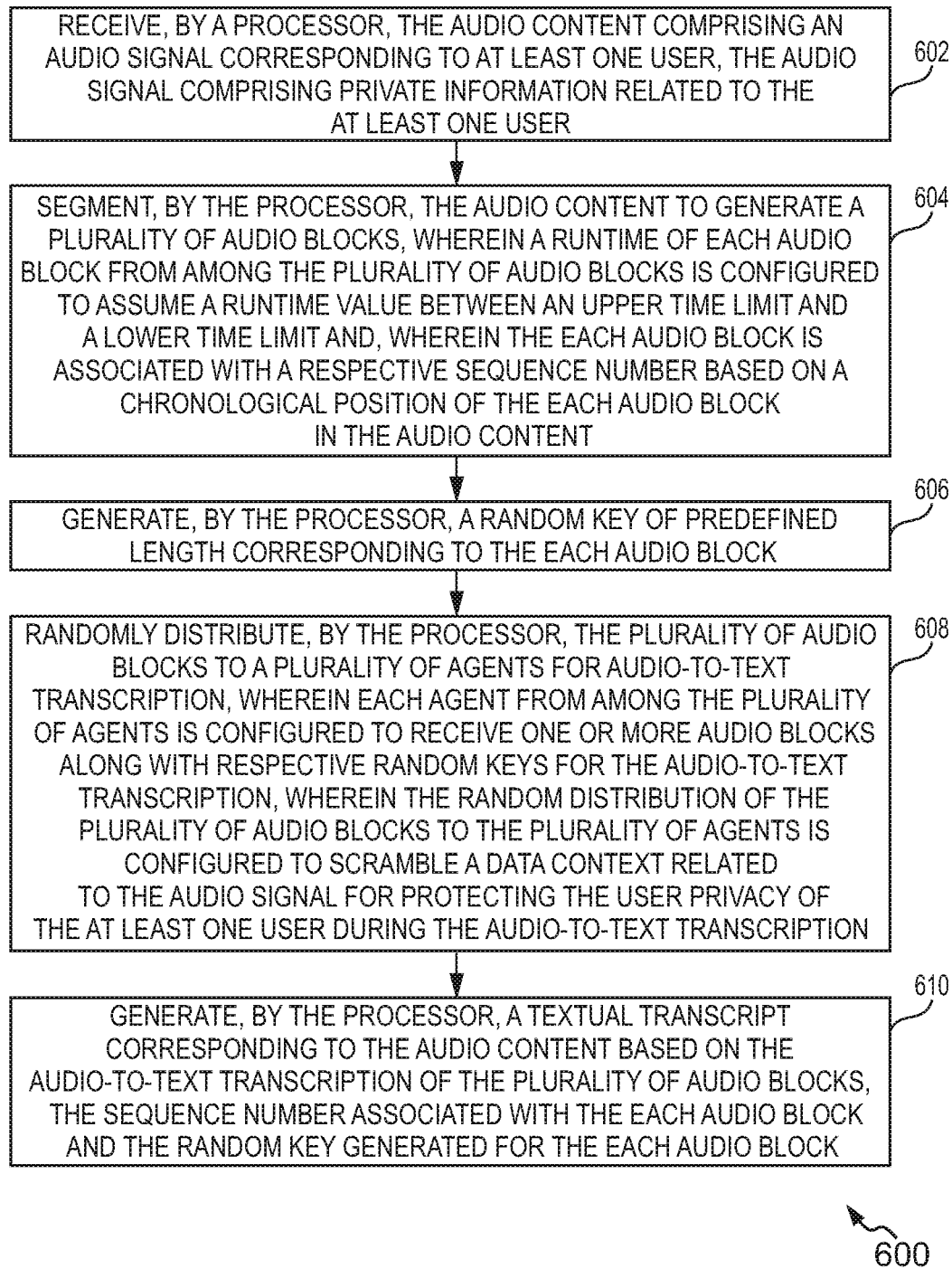
FIG. 6 shows a flow diagram of a method for protecting user privacy in audio content during audio content processing, in accordance with an embodiment of the invention.

FIG. 6 shows a flow diagram of a method 600 for protecting user privacy in audio content, in accordance with an embodiment of the invention. The various steps and/or operations of the flow diagram, and combinations of steps/operations in the flow diagram, may be implemented by, for example, hardware, firmware, a processor, circuitry and/or by an apparatus such as the server system 150 explained with reference to FIGS. 1 to 5. The method 600 starts at operation 602.

At operation 602 of the method 600, the audio content including an audio signal corresponding to at least one user is received by a processor of a system, such as the processor 152 of the system 150 explained with reference to FIG. 2. The audio content may include conversational content between two or more users. Accordingly, the audio content may include audio signal (i.e., speech signal) corresponding to voice input of the two or more users. For example, the audio signal may be provided by a customer during a voice interaction with an agent of the enterprise as exemplarily explained in FIG. 1. The audio content may be received from a database, such as the database 108 shown in FIG. 1, and the audio signal includes private information related to the at least one user. The private information includes at least one of personal information, health related information, banking and finance related information and education related information of the at least one user.

At operation 604 of the method 600, the audio content is segmented to generate a plurality of audio blocks. More specifically, the audio content is sliced into discrete segments of variable runtimes to generate a plurality of audio blocks. A runtime of each audio block is configured to assume a runtime value between an upper time limit and a lower time limit. Specifically, a distribution of voice activity associated with the audio signal in the audio content is analysed for generating the audio blocks such that each audio block captures at least one word or a phrase while adhering to the upper time limit and the lower time limit restrictions. The limitations on the runtime value of each audio block imposed by restricting the upper time limit and the lower time limit ensure that each audio block is intelligible for audio-to-text transcription and not too long to reveal private information of the user.

In at least one example embodiment, the upper time limit and the lower time limit are selected based on a predetermined level of user privacy. For example, upper time limit may be selected as 2 seconds and lower time limit may be selected as 1 second for conversations related to payment transactions. As such, runtime values of all audio blocks do not exceed 1 second. Moreover, each audio block is associated with a sequence number based on a chronological position of the audio block in the audio content. The segmentation of the audio content, resulting in the generation of the plurality of audio blocks, may be performed as explained in detail with reference to FIG. 3.

At operation 606 of the method 600, a random key of predefined length is generated for each audio block. The random key may be an n-bit alphanumeric number that uniquely identifies an audio block among the plurality of audio blocks. The random key of each audio block is correlated with corresponding sequence number and stored in a database such as, the database 108 shown in FIG. 1. It shall be noted that no two blocks may share the same unique identifier. The generation of the random key for each audio block, may be performed as explained with reference to FIG. 3.

At operation 608 of the method 600, the plurality of audio blocks is randomly distributed to a plurality of agents for audio-to-text transcription. More specifically, each agent is configured to receive one or more audio blocks along with respective random keys for providing an audio-to-text transcription of the corresponding audio block. Accordingly, each agent is assigned one or more random keys and corresponding audio snippets (i.e., audio blocks) from the audio content. The plurality of agents may correspond to human agents and/or automated agents. Such random distribution of the audio blocks to the agents for audio-to-text transcription scrambles a data context related to the audio content and ensures that the agents neither have access to the entire audio content nor knowledge of the data context related to the audio blocks thereby protecting the user privacy of the at least one user. Moreover, the random distribution of the audio blocks prevents the agents from accessing private information of the at least one user in the audio content.

It shall be noted that although the audio blocks of the audio content are segmented and randomly assigned to the agents based on the random key, there is no associated loss of data. As such, only information capable of revealing the private information related to the user is scrambled and concealed. Randomly distributing the plurality of audio blocks for audio-to-text transcription may be performed as explained in detail with reference to FIG. 4.

At operation 610 of the method 600, a textual transcript corresponding to the audio content is generated based on audio-to-text transcription of the plurality of audio blocks. The audio-to-text transcription of the plurality of audio blocks received from the plurality of agents may be collated and mapped based on corresponding random keys and associated sequence numbers to generate the textual transcript of the audio content. More specifically, the correlation between the sequence number and the random key corresponding to the each audio block is used for rearranging the audio-to-text transcription in relation to each audio block to configure a sequential transcript that constitutes the textual transcript.

In at least one example embodiment, a flag may be received in relation to at least one audio block provided to an agent for audio-to-text transcription. The flag may indicate location of an incomplete word in at least one audio block. Such audio blocks with a flag are tagged as flagged audio blocks and go through further processing. Accordingly, a runtime value of the flagged audio block is adapted to capture the incomplete word by manipulating runtime values of the flagged audio block and adjacent audio blocks. After manipulation, the flagged audio blocks and adjacent audio blocks are reassigned to different agents for audio-to-text transcription. The textual transcript is used, at least in part, to train a machine learning model for building an Automatic Speech Recognition (ASR) engine. The method 600 ends at operation 610.

Figure 7:
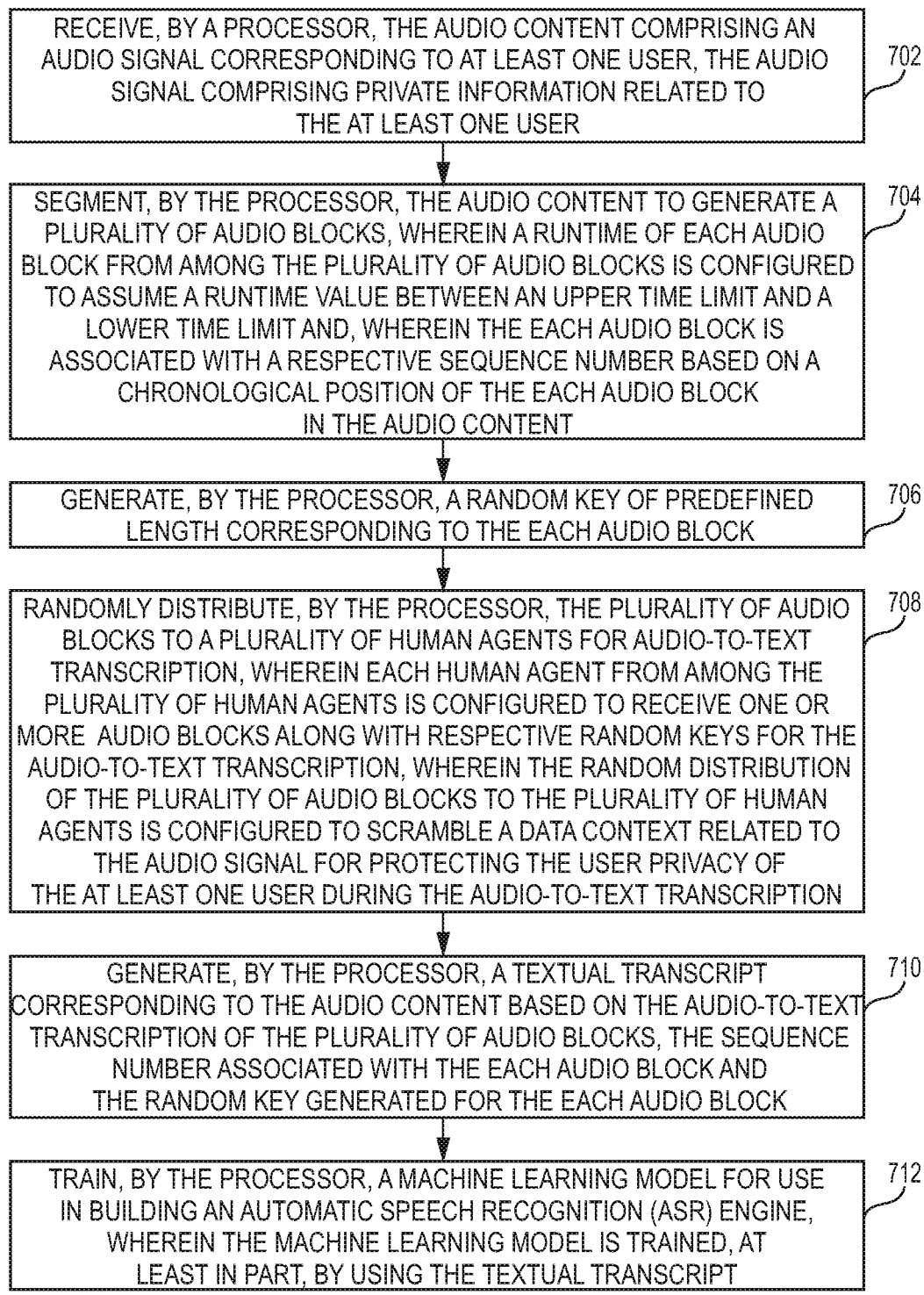
FIG. 7 shows a flow diagram of a method for protecting user privacy in audio content during audio content processing, in accordance with another embodiment of the invention.

FIG. 7 show a flow diagram of a method 700 for protecting user privacy in audio content during audio content processing, in accordance with an embodiment of the invention. The various steps and/or operations of the flow diagram, and combinations of steps/operations in the flow diagram, may be implemented by, for example, hardware, firmware, a processor, circuitry and/or by an apparatus such as the system 150 explained with reference to FIGS. 1 to 5B. The method 700 starts at operation 702.

At operation 702 of the method 700, the audio content including an audio signal corresponding to at least one user is received by a processor of a system, such as the processor 152 of the system 150 explained with reference to FIG. 2. The audio content may be received from a database, such as the database 108 shown in FIG. 1, and includes private information related to the at least one user.

At operation 704 of the method 700, the audio content is segmented to generate a plurality of audio blocks. A runtime of each audio block from among the plurality of audio blocks is configured to assume a runtime value between an upper time limit and a lower time limit. Moreover, the each audio block is associated with a respective sequence number based on a chronological position of the each audio block in the audio content. The generation of the plurality of audio blocks may be performed as explained with reference to operation 604 of the method 600 of FIG. 6 and is not explained again herein for sake of brevity.

At operation 706 of the method 700, a random key of predefined length corresponding to the each audio block is generated for each audio block as explained with reference to FIG. 3.

At operation 708 of the method 700, the plurality of audio blocks is randomly distributed to a plurality of human agents for audio-to-text transcription. Each human agent from among the plurality of human agents is configured to receive one or more audio blocks along with respective random keys for the audio-to-text transcription. The random distribution of the plurality of audio blocks to the plurality of human agents is configured to scramble a data context related to the audio content for protecting the user privacy of the at least one user during the audio-to-text transcription. Random distribution of the plurality of audio blocks may be performed as explained with reference to operation 608 of the method 600 of FIG. 6 and is not explained again herein for sake of brevity.

At operation 710 of the method 700, a textual transcript corresponding to the audio content is generated based on the audio-to-text transcription of the plurality of audio blocks, the sequence number associated with the each audio block and the random key generated for the each audio block. The generation of the textual transcript from the textual data may be performed as explained in detail with reference to FIG. 4.

At operation 712 of the method 700, a machine learning model is trained for use in building an Automatic Speech Recognition (ASR) engine. More specifically, the machine learning model is trained using the textual transcript. The method 700 ends at operation 712.

Various embodiments disclosed herein provide numerous advantages. More specifically, the embodiments disclosed herein suggest techniques for protecting user privacy during processing of audio content for transcription. The data sequence of the audio content is segmented into blocks including only a small portion of the audio content and then the audio blocks are randomly distributed to the agents so as to scramble and conceal sensitive information related to the user in the audio content. Moreover, though the audio content is segmented into audio blocks, the content (i.e., audio blocks) includes intelligible data (i.e., words) that may be transcribed by a trained human listener or an automated agent. Such scrambling of data context in audio not only protects the identity of the speaker but also avoids access to private information revealed by the speaker in the audio content. Further, the scrambling of data context ensures that agents (either manual or automated agents) have no information related to the context of the content, and thus the concern related to the user privacy is addressed. Furthermore, assignment of unique identifiers ensures the randomized data sequence of the content may be securely mapped to determine the textual transcription of the audio content.

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the system 150 and its various components such as the processor 152, the memory 154, the I/O module 162, and the communication module 164 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor or computer to perform one or more operations (for example, operations explained herein with reference to FIG. 6 or 7). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the present invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method for protecting user privacy in audio content, the method comprising:
   receiving, by a processor, the audio content comprising an audio signal corresponding to at least one user, the audio signal comprising private information related to the at least one user;
   segmenting, by the processor, the audio content to generate a plurality of audio blocks, wherein a runtime of each audio block from among the plurality of audio blocks is configured to assume a runtime value between an upper time limit and a lower time limit and, wherein the each audio block is associated with a respective sequence number based on a chronological position of the each audio block in the audio content;
   generating, by the processor, a random key of predefined length corresponding to the each audio block;
   randomly distributing, by the processor, the plurality of audio blocks to a plurality of agents for audio-to-text transcription, wherein each agent from among the plurality of agents is configured to receive one or more audio blocks along with respective random keys for the audio-to-text transcription, wherein the random distribution of the plurality of audio blocks to the plurality of agents is configured to scramble a data context related to the audio signal for protecting the user privacy of the at least one user during the audio-to-text transcription; and
   generating, by the processor, a textual transcript corresponding to the audio content based on the audio-to-text transcription of the plurality of audio blocks, the sequence number associated with the each audio block and the random key generated for the each audio block.

2. The method as claimed in claim 1, wherein the upper time limit and the lower time limit are selected based on a predetermined level of user privacy.

3. The method as claimed in claim 1, wherein the audio content is segmented based on a distribution of voice activity in the audio content to generate the plurality of audio blocks, and wherein the runtime value of the each audio block adheres to the upper time limit and the lower time limit restrictions.

4. The method as claimed in claim 1, further comprising:
   correlating, by the processor, the random key generated for the each audio block with the sequence number associated with the each audio block; and
   storing, by the processor, the correlation between the random key and the sequence number for the each audio block.

5. The method as claimed in claim 4, wherein generating the textual transcript comprises:
   receiving, by the processor, the audio-to-text transcription of the plurality of audio blocks from the plurality of agents, wherein each agent provides the audio-to-text transcription corresponding to the respective one or more audio blocks to configure the audio-to-text transcription for the plurality of audio blocks and, wherein audio-to-text transcription of the each audio block is associated with the random key generated in relation to the corresponding audio block;
   retrieving, by the processor, the sequence number corresponding to the random key based on the correlation between the random key and the sequence number for the each audio block; and rearranging, by the processor, the audio-to-text transcription received in relation to the each audio block based on associated sequence number to configure a sequential transcription of the audio content, wherein the sequential transcription of the audio content configures, at least in part, the textual transcript.

6. The method as claimed in claim 1, further comprising:
receiving, by the processor, a flag in relation to at least one audio block from the one or more audio blocks provided to the each agent for the audio-to-text transcription, wherein each audio block of the at least one audio block associated with the flag is tagged as a flagged audio block;
adapting, by the processor, a runtime value of the flagged audio block by manipulating runtime values of audio blocks adjacent to the flagged audio block; and
reassigning, by the processor, the flagged audio block and the audio blocks adjacent to the flagged audio block to the respective agents for the audio-to-text transcription.

7. The method as claimed in claim 3, wherein one or more speech recognition techniques are used for determining the distribution of voice activity in the audio content to facilitate segmentation of the audio content.

8. The method as claimed in claim 1, wherein at least one agent from among the plurality of agents corresponds to a human agent.

9. The method as claimed in claim 1, wherein each agent from among the plurality of agents corresponds to an automated agent.

10. The method as claimed in claim 1, wherein the private information comprises at least one of personal information of the at least one user, health related information of the at least one user, banking and finance related information of the at least one user and education related information of the at least one user.

11. The method as claimed in claim 1, wherein the textual transcript is used, at least in part, to train a machine learning model for use in building an Automatic Speech Recognition (ASR) engine.

12. A system for protecting user privacy in audio content, the system comprising: a memory for storing instructions; and
a processor configured to execute the instructions and thereby cause the system to at least
receive the audio content comprising an audio signal corresponding to at least one user, the audio signal comprising private information related to the at least one user;
segment the audio content to generate a plurality of audio blocks, wherein a runtime of each audio block from among the plurality of audio blocks is configured to assume a runtime value between an upper time limit and a lower time limit and, wherein the each audio block is associated with a respective sequence number based on a chronological position of the each audio block in the audio content;
generate a random key of predefined length corresponding to the each audio block;
randomly distribute the plurality of audio blocks to a plurality of agents for audio-to-text transcription, wherein each agent from among the plurality of agents is configured to receive one or more audio blocks along with respective random keys for the audio-to-text transcription, wherein the random distribution of the plurality of audio blocks to the plurality of agents is configured to scramble a data context related to the audio signal for protecting the user privacy of the at least one user during the audio-to-text transcription; and
generate a textual transcript corresponding to the audio content based on the audio-to-text transcription of the plurality of audio blocks, the sequence number associated with the each audio block and the random key generated for the each audio block.

13. The system as claimed in claim 12, wherein the upper time limit and the lower time limit are selected based on a predetermined level of user privacy.

14. The system as claimed in claim 12, wherein the audio content is segmented based on a distribution of voice activity in the audio content to generate the plurality of audio blocks, and wherein the runtime value of the each audio block adheres to the upper time limit and the lower time limit restrictions.

15. The system as claimed in claim 12, wherein the system is further caused to:
correlate the random key generated for the each audio block with the sequence number associated with the each audio block; and
store the correlation between the random key and the sequence number for the each audio block.

16. The system as claimed in claim 15, wherein for generation of the textual transcript the system is further caused to:
receive the audio-to-text transcription of the plurality of audio blocks from the plurality of agents, wherein each agent provides the audio-to-text transcription corresponding to the respective one or more audio blocks to configure the audio-to-text transcription for the plurality of audio blocks and, wherein the audio-to-text transcription of the each audio block is associated with the random key generated in relation to the corresponding audio block;
retrieve the sequence number corresponding to the random key based on the correlation between the random key and the sequence number for the each audio block; and
rearrange the audio-to-text transcription received in relation to the each audio block based on associated sequence number to configure a sequential transcription of the audio content, wherein the sequential transcription of the audio content configures, at least in part, the textual transcript.

17. The system as claimed in claim 12, wherein the system is further caused to:
receive a flag in relation to at least one audio block from the one or more audio blocks provided to the each agent for the audio-to-text transcription, wherein each audio block of the at least one audio block associated with the flag is tagged as a flagged audio block;
adapt a runtime value of the flagged audio block by manipulating runtime values of audio blocks adjacent to the flagged audio block; and
reassign the flagged audio block and the audio blocks adjacent to the flagged audio block to the respective agents for the audio-to-text transcription.

18. A computer-implemented method for protecting user privacy in audio content, the method comprising:
receiving, by a processor, the audio content comprising an audio signal corresponding to at least one user, the audio signal comprising private information related to the at least one user;
segmenting, by the processor, the audio content to generate a plurality of audio blocks, wherein a runtime of each audio block from among the plurality of audio blocks is configured to assume a runtime value between an upper time limit and a lower time limit and, wherein the each audio block is associated with a respective sequence number based on a chronological position of the each audio block in the audio content;

generating, by the processor, a random key of predefined length corresponding to the each audio block;

randomly distributing, by the processor, the plurality of audio blocks to a plurality of human agents for audio-to-text transcription, wherein each human agent from among the plurality of human agents is configured to receive one or more audio blocks along with respective random keys for the audio-to-text transcription, wherein the random distribution of the plurality of audio blocks to the plurality of human agents is configured to scramble a data context related to the audio signal for protecting the user privacy of the at least one user during the audio-to-text transcription;

generating, by the processor, a textual transcript corresponding to the audio content based on the audio-to-text transcription of the plurality of audio blocks, the sequence number associated with the each audio block and the random key generated for the each audio block; and training, by the processor, a machine learning model for use in building an Automatic Speech Recognition (ASR) engine, wherein the machine learning model is trained, at least in part, by using the textual transcript.

19. The method as claimed in claim 18, further comprising:

receiving, by the processor, the audio-to-text transcription of the plurality of audio blocks from the plurality of human agents, wherein the each human agent provides the audio-to-text transcription corresponding to the respective one or more audio blocks to configure the audio-to-text transcription for the plurality of audio blocks and, wherein the audio-to-text transcription of the each audio block is associated with the random key generated in relation to the corresponding audio block;

retrieving, by the processor, the sequence number corresponding to the random key based on a correlation between the random key and the sequence number for the each audio block; and rearranging, by the processor, the audio-to-text transcription received in relation to the each audio block based on associated sequence number to configure a sequential transcription of the audio content, wherein the sequential transcription of the audio content configures, at least in part, the textual transcript.

20. The method as claimed in claim 18, wherein generating the textual transcript comprises:

receiving, by the processor, a flag in relation to at least one audio block from the one or more audio blocks provided to the each human agent for the audio-to-text transcription, wherein each audio block of the at least one audio block associated with the flag is tagged as a flagged audio block;

adapting, by the processor, a runtime value of the flagged audio block by manipulating runtime values of audio blocks adjacent to the flagged audio block; and reassigning, by the processor, the flagged audio block and the audio blocks adjacent to the flagged audio block to the respective human agents for the audio-to-text transcription.

* * * * *